(12) United States Patent
Klimovski et al.

(10) Patent No.: US 11,046,036 B2
(45) Date of Patent: Jun. 29, 2021

(54) METHOD OF POSITIONING A BRAIDED FIBRE SLEEVE

(71) Applicant: The Boeing Company, Chicago, IL (US)

(72) Inventors: Andrew Klimovski, Melbourne (AU); Peter Steele, Melbourne (AU); Luke Fletcher, Yarraville (AU)

(73) Assignee: THE BOEING COMPANY, Chicago, IL (US)

( * ) Notice: Subject to any disclaimer, the term of this patent is extended or adjusted under 35 U.S.C. 154(b) by 194 days.

(21) Appl. No.: 15/693,959

(22) Filed: Sep. 1, 2017

(65) Prior Publication Data

US 2018/0079156 A1 Mar. 22, 2018

(30) Foreign Application Priority Data

Sep. 20, 2016 (AU) .............................. 2016231486

(51) Int. Cl.
*B29C 70/56* (2006.01)
*B29C 70/22* (2006.01)
(Continued)

(52) U.S. Cl.
CPC ............ *B29C 70/56* (2013.01); *B29C 70/222* (2013.01); *B29C 70/443* (2013.01); *B29C 70/446* (2013.01); *B29C 70/541* (2013.01); *B29D 23/00* (2013.01); *B29K 2105/0827* (2013.01); *B29L 2023/00* (2013.01)

(58) Field of Classification Search
CPC ..... B29C 70/56; B29C 70/541; B29C 70/443; B29C 70/446; B29C 70/222; B29C 70/54; B29D 23/00; B29K 2105/0827; B29L 2023/00; D04C 3/00
See application file for complete search history.

(56) References Cited

U.S. PATENT DOCUMENTS

| 4,719,837 A * | 1/1988 | McConnell | D04C 3/12 87/1 |
| 5,395,718 A * | 3/1995 | Jensen | G03F 1/68 343/708 |

(Continued)

FOREIGN PATENT DOCUMENTS

| CN | 201497430 U | 6/2010 |
| CN | 202347232 U | 7/2012 |
| CN | 104589663 A | 5/2015 |

OTHER PUBLICATIONS

Extended European Search Report for Application No. EP17191800.8 dated Feb. 8, 2018.
(Continued)

*Primary Examiner* — Francisco W Tschen
*Assistant Examiner* — Guy F Mongelli
(74) *Attorney, Agent, or Firm* — Coats & Bennett, PLLC

(57) ABSTRACT

A method of positioning a braided fibre sleeve relative to a tool surface, the braided fibre sleeve comprising a longitudinal axis and biaxially oriented tows arranged at acute angles relative to the longitudinal axis, the method comprising; applying tension to a plurality of axial threads disposed along the longitudinal axis, such tension forming a tensioned braided fibre sleeve; positioning the tensioned braided fibre sleeve relative to a tool surface; and releasing tension on the plurality of axial threads.

24 Claims, 8 Drawing Sheets

(51) Int. Cl.
  *B29C 70/44* (2006.01)
  *B29C 70/54* (2006.01)
  *B29D 23/00* (2006.01)
  *B29K 105/08* (2006.01)
  *B29L 23/00* (2006.01)

(56) References Cited

U.S. PATENT DOCUMENTS

| | | | | |
|---|---|---|---|---|
| 6,148,865 | A * | 11/2000 | Head | B29C 70/222 138/123 |
| 6,250,193 | B1 | 6/2001 | Head | |
| 6,491,773 | B1 * | 12/2002 | Miller | B29C 53/8016 156/229 |
| 2006/0260100 | A1 * | 11/2006 | Duda | D01G 23/06 19/236 |
| 2010/0215311 | A1 * | 8/2010 | Moore | G01B 11/18 385/13 |
| 2012/0012620 | A1 * | 1/2012 | Mejia | D04C 3/00 223/35 |
| 2012/0292425 | A1 * | 11/2012 | van der Zee | B29C 70/54 242/559.1 |
| 2013/0056575 | A1 * | 3/2013 | Grimshaw | B29C 70/38 242/559 |
| 2014/0298768 | A1 * | 10/2014 | Head | D04C 3/14 56/51 |
| 2015/0328845 | A1 | 11/2015 | Lockett et al. | |
| 2016/0000443 | A1 * | 1/2016 | Lilburn | A61B 17/128 606/158 |
| 2016/0257052 | A1 * | 9/2016 | Sun | B29C 49/0073 |
| 2016/0259079 | A1 * | 9/2016 | Wilson | G01V 1/42 |
| 2017/0129583 | A1 * | 5/2017 | Fletcher | B29C 70/542 |

OTHER PUBLICATIONS

CN Office Action dated Aug. 20, 2020 in re CN Application No. 201710695073.0.

* cited by examiner

METHOD OF POSITIONING A BRAIDED FIBRE SLEEVE

This application claims the benefit of Australian application No. 2016231486, filed on 20 Sep. 2016, the disclosure of which is incorporated herein by reference in its entirety.

FIELD

The present invention relates to a method of positioning a braided fibre sleeve, to a method of manufacturing a structural component and to a structural component made according to the method.

BACKGROUND

Braided fibre sleeves are used throughout the aviation and automotive industries as the basis for the manufacture of structural components having a closed cross section such as door sections, stringers or spars or other components which are manufactured as a closed section before being cut into open sections, for example stiffeners. In some instances, the braided fibre sleeves are placed on a mandrel or other tool prior to being infused with resin where necessary and cured to form the structural composite component. The braided fibre sleeves are placed onto the mandrel by hand and require the operator to handle and manipulate the sleeve onto the mandrel, typically by using their fingers to bunch up the sleeve as it is placed onto the mandrel. This process is labour intensive and time consuming.

An alternative method of placing the sleeve onto a mandrel is to overbraid the sleeve onto the mandrel. This process involves passing the mandrel through the centre of a braiding machine as the sleeve is braided onto it. The equipment needed to perform this process can be large and cumbersome. The size and length of part that can be manufactured using this method is limited to the capabilities of the equipment.

The present disclosure is made bearing the above problems in mind.

SUMMARY

The disclosure relates to a method of and system for positioning a braided fibre sleeve relative to a tool surface. It also relates to a method of fabricating a composite component and to a composite component made therefrom.

According to a first aspect, the present disclosure provides a method of positioning a braided fibre sleeve relative to a tool surface, the braided fibre sleeve comprising a longitudinal axis and biaxially oriented tows arranged at acute angles relative to the longitudinal axis, the method comprising; applying tension to a plurality of axial threads disposed along the longitudinal axis, such tension forming a tensioned braided fibre sleeve; positioning the tensioned braided fibre sleeve relative to a tool surface; and releasing the tension on the plurality of axial threads.

In one embodiment, the step of applying tension to the plurality of axial threads comprises applying tension to at least one of the plurality of axial threads at an angle of greater than zero degrees relative to the longitudinal axis.

In another embodiment, the step of applying tension to the plurality of axial threads comprises applying tension to each of the plurality of axial threads at an angle of greater than zero degrees relative to the longitudinal axis.

In one embodiment, the step of positioning the tensioned braided fibre sleeve relative to a tool surface comprises moving the braided fibre sleeve onto the tool surface. In another embodiment, it comprises moving the tool surface into the tensioned braided fibre sleeve. In another aspect, the tool surface may comprise, for example, the surface of a mandrel or former.

According to an embodiment, a detection device is configured to detect the presence of the plurality of axial threads and, prior to the step of applying tension to the plurality of axial threads disposed along the longitudinal axis, the presence of the plurality of axial threads is detected with the detection device.

Detecting the presence of the plurality of axial threads with the detection device preferably comprises detecting the presence of a visual property, for example a colour of, the plurality of axial threads or detecting the presence of a magnetic property of the plurality of axial threads, for example the presence of ferrous material in the plurality of axial threads.

In an embodiment, following the step of releasing the tension on the axial threads, the axial threads are removed from the braided fibre sleeve.

In an embodiment, the braided fibre sleeve is a first braided fibre sleeve and, following the step of releasing the tension on the axial threads, the method comprises positioning at least a second braided fibre sleeve relative to the tool surface.

According to a second aspect, the present disclosure provides a method of fabricating a composite component, the method comprising positioning a braided fibre sleeve relative to a tool surface according to the first aspect; infusing the braided fibre sleeve or sleeves with resin to form a resin infused sleeve, and curing the sleeve or sleeves to produce the composite component.

According to a third aspect, the present disclosure provides a composite component, fabricated in accordance with the second aspect.

According to a fourth aspect, the present disclosure provides a system for positioning a braided fibre sleeve relative to a tool surface, the system comprising a detection device configured to detect each thread of a plurality of axial threads disposed along a longitudinal axis of the braided fibre sleeve; and at least one automated machine configured to apply tension to the detected plurality of axial threads to form a tensioned braided fibre sleeve and to position the tensioned braided fibre sleeve relative to the tool surface.

In one embodiment, the detection device comprises a camera configured to visually detect the presence of the plurality of axial threads. Alternatively or additionally, the detection device comprises a magnet configured to magnetically detect the presence of the plurality of axial threads.

According to one embodiment, the at least one automated machine is configured to move the tensioned braided fibre sleeve onto the tool surface. In an alternative embodiment, the at least one automated machine is configured to move the tool surface into the tensioned braided fibre sleeve.

In one embodiment, the at least one automated machine is, for example, configured to release the tension on the plurality of axial threads following the positioning of the tensioned braided fibre sleeve relative to the tool surface.

In an embodiment, the system comprises a controller configured to automatically control one or more of the at least one thread detection device and the at least one automated machine in accordance with a predefined program.

In an embodiment, the at least one automated machine includes at least one robot.

In another embodiment, the at least one automated machine includes a five-axis gantry.

Preferably, the tool surface is the surface of a mandrel or former.

The features that have been discussed can be achieved independently in various embodiments or may be combined in yet other embodiments further details of which can be seen with reference to the following description and drawings.

DRAWINGS

Preferred embodiments of the present disclosure will now be described, by way of examples only, with reference to the accompanying drawings wherein.

DETAILED DESCRIPTION

Methods and systems according to exemplary embodiments of the present disclosure will now be described in detail. In general, methods of positioning a braided fibre sleeve relative to a tool surface are disclosed. The braided fibre sleeve has a longitudinal axis and biaxially arranged tows arranged at acute angles relative to the longitudinal axis. The method comprises applying tension to a plurality of axial threads disposed along the longitudinal axis. The tensioning may be applied to at least one of the plurality of axial threads at an angle of greater than zero degrees relative to the longitudinal axis. The tensioning forms a tensioned braided fibre sleeve. The method further comprises positioning the tensioned braided fibre sleeve relative to a tool surface, for example a surface of a mandrel or former. The method further comprises releasing the tension on the plurality of axial threads. More than one braided fibre sleeve may be positioned relative to the tool. The positioned braided fibre sleeve or sleeves are cured to produce a composite component. In some embodiments, the braided fibre sleeve or sleeves are infused with resin to form a resin infused braided fibre sleeve, and cured, typically in an oven, to produce the composite component.

Figure 1:
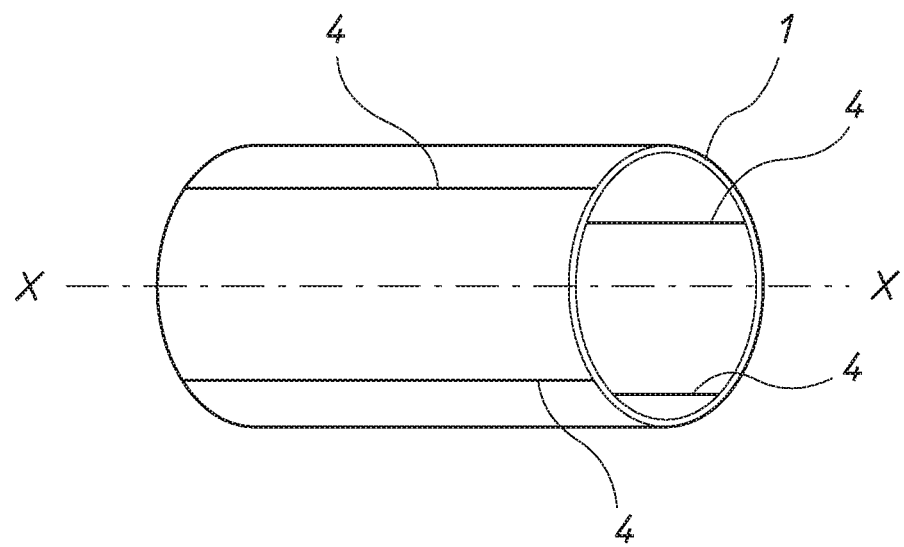
FIG. 1 is a schematic illustration of a braided fibre sleeve.
Figures 2A, 2B:
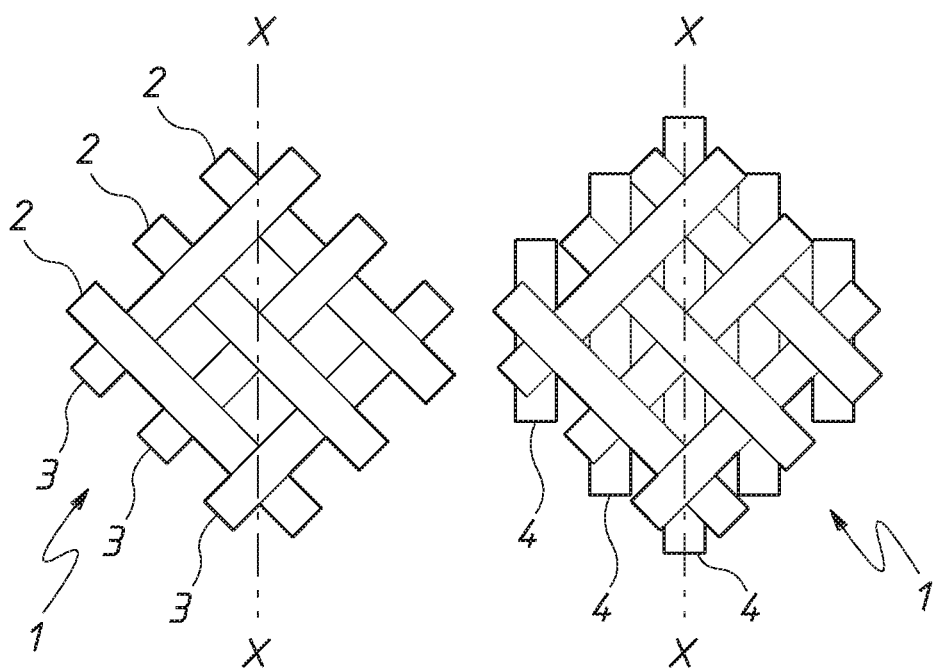
FIG. 2a is a schematic illustration of biaxially arranged tows such as is used in a braided fibre sleeve.
FIG. 2b is a schematic illustration of the biaxially arranged tows of FIG. 2a with axially arranged threads threaded therethrough.

Now referring to FIGS. 1 to 2b, a braided fibre sleeve 1 comprises tows of a reinforcing material such as carbon or glass fibre. The sleeve 1 may be open ended as shown in FIG. 1 or it may have a closed end. The sleeve 1 may be generally cylindrical in shape and can be produced in any number of configurations, with varied perimeter size and braid angles. Typical braided fibre sleeves 1 are formed of biaxially oriented fibre tows 2, 3 that make up the sleeve 1. A portion of such a biaxially braided fibre sleeve is shown in FIG. 2a. The biaxially oriented fibre tows 2, 3 illustrated in FIG. 2a are arranged at angles of 45 degrees relative to a longitudinal axis x-x, however the tows 2, 3 may be arranged at any acute angle relative to the longitudinal axis x-x. The portion of braided fibre sleeve 1 shown in FIG. 2b has a number of axial threads 4 braided within the sleeve. Such axial threads 4 can be provided within the braided fibre sleeve 1 for the benefit of providing increased material strength in the direction of the axial thread 4 and, in accordance with the present disclosure, to assist in the positioning of the braided fibre sleeve 1 relative to a tool surface. The threads can typically be made of any appropriate material for providing material strength and in one example the thread is made of a ferrous material. In another example the threads have an easily identifiable colour. Whilst the braided fibre sleeve 1 of example embodiments of the present disclosure have four axial threads woven into the sleeve, the number and location of the axial threads 4 woven within the braided fibre sleeve 1 can vary depending on the specific part to be fabricated and its application.

The tool 110 onto which the braided fibre sleeve 1 is to be positioned may be formed of any of various structural materials, including mild steel, stainless steel, invar or a carbon composite material that will maintain its form at elevated temperatures associated with curing, so as to provide a geometrically stable tool surface 111 throughout the resin curing process. The tool surface 111 can be shaped as desired so as to provide a shaped surface of a non-planar composite structure. In the example embodiments, the tool 110 is a mandrel, however it is also envisaged that it may be a former or other suitable tool. The mandrel 110 shown in FIGS. 6 to 10 has a circular cross section, however it can have any cross-sectional shape, e.g. elliptical or polygonal, depending on the particular application at hand. The mandrel 110 has a lead-in end that can include a tapered or rounded surface that is adapted to help feed the braided fibre sleeve 1 smoothly onto the mandrel 110.

The braided fibre sleeve 1 can be positioned relative to the tool surface manually by one or more technicians or it can be positioned relative to the tool surface using an automated machine, for example a five axis gantry (not shown) or one or more robots. An exemplary embodiment of a system for positioning the braided fibre sleeve 1 relative to the tool surface 111 is described below.

Figure 3:
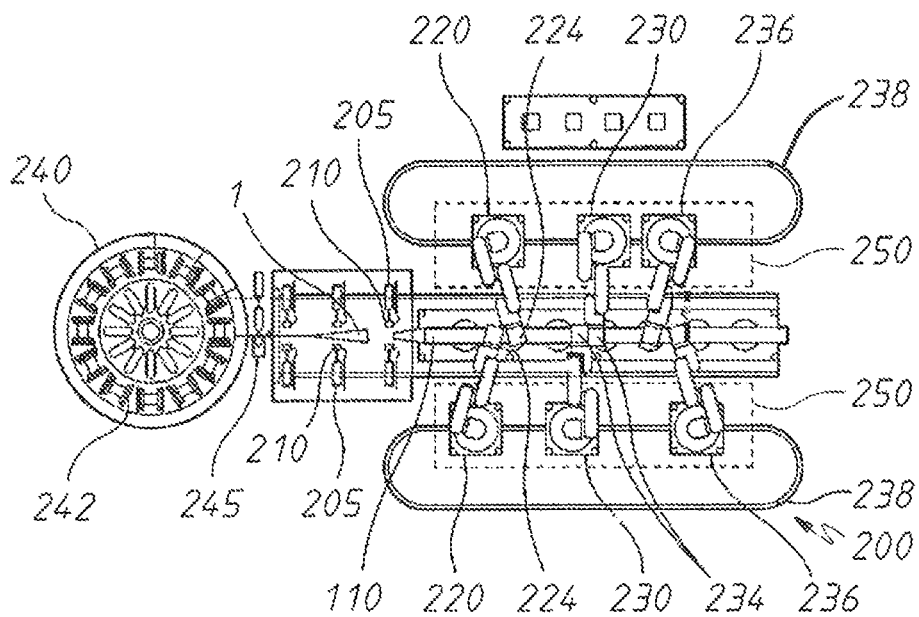
FIG. 3 is a schematic representation of an exemplary system for automating the exemplary embodiment of the method.
Figure 4:
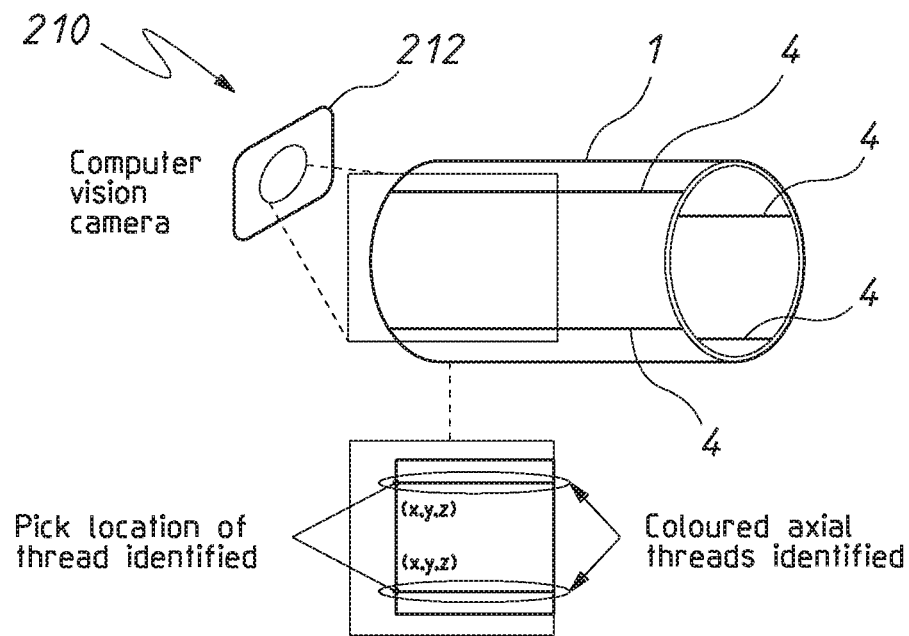
FIG. 4 is a schematic representation of a first embodiment of a thread detection device.
Figure 5:
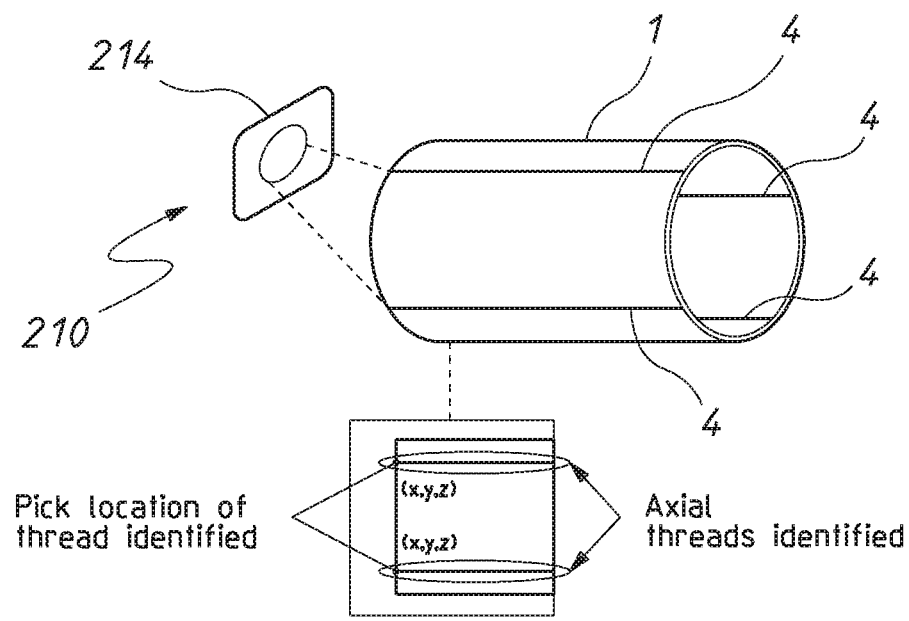
FIG. 5 is a schematic representation of a second embodiment of a thread detection device.
Figure 6:
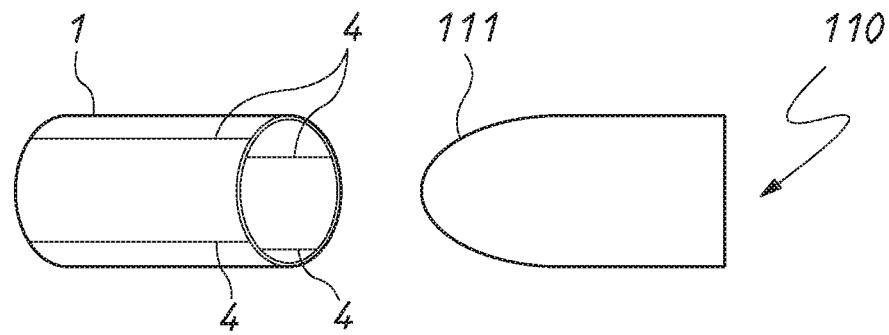
FIG. 6 is a schematic representation of a braided fibre sleeve and tool surface of an exemplary embodiment.

Referring to FIGS. 3 to 5, an embodiment of a system 200 for positioning the braided fibre sleeve 1 relative to the tool surface 111 comprises a number of thread detection devices 210 that are configured to detect the presence of each of the axial threads 4 disposed along the longitudinal axis x-x of the braided fibre sleeve 1, a tensioner robot 220 configured to apply tension to each of the axial threads 4 to form a tensioned braided fibre sleeve and a positioner robot 230 configured to position the tensioned braided fibre sleeve relative to the mandrel surface 111. The tensioner robot 220 is further configured to release the tension on each of the axial threads 4 following the positioning of the tensioned braided fibre sleeve 1 relative to the mandrel surface 111.

As seen in FIG. 3, a reel 242 of the braided fibre sleeve 1 is supplied from a rotatable sleeve carousel 240. The sleeves 1 wound on the reels 242 can vary from one to the other in one or more selected parameters, e.g. weave, internal diameter. The sleeve carousel 240 is arranged to present a selected one of the reels 242 and its associated sleeve 1 to a lead-in end of the mandrel 110 for subsequent positioning relative thereto. A length cutter 245 is provided to cut the braided fibre sleeve 1 to the desired length once it has been spooled off the reel 242. The mandrel 110 is cantilevered at a distal end 113 thereof and supported along its length by one or more vertical supports (not shown) and/or by an underlying support plate 268.

In the described embodiment, the thread detection devices 210 are associated with a series of thread locators 205 that are configured to hold the braided fibre sleeve 1 in position ahead of the lead-in end of the mandrel 110. The thread detection devices 210 are configured to detect the presence of the axial threads 4 within the braided fibre sleeve 1 and to capture the location co-ordinates of the axial threads 4, for example the x, y and z co-ordinates of points of the axial threads that lie adjacent to the ends of the braided fibre sleeve 1, as shown in FIG. 4. For longer lengths of sleeve, the thread detection devices 210 can also be configured to capture location co-ordinates of the axial threads that are at a location along the sleeve in order to tension a part of the sleeve that lies away from its ends.

An embodiment of one of the detection devices 210 shown schematically in FIG. 4 comprises a computer vision system comprising a camera 212 that is configured to detect the axial threads 4 based on a visual characteristic such as their colour. In an alternative embodiment shown in FIG. 5, the detection device 210 includes an electromagnet 214 that is configured to detect ferrous material present in the axial threads 4.

The tensioner robot 220 and the positioner robot 230 each comprise one or more computer controlled robots that are supported on an oval shaped track 238 for independent movement thereon. The continuous loop track 238 is arranged adjacent and parallel to the mandrel 110. Each of the robots 220, 230 is equipped with an arm 224, 234 having a distal end that is moveable by the associated robot 220, 230 in multiple degrees of freedom. The arms 224 of the tensioner robot 220 are configured to pick the axial threads 4 at the location coordinates captured by the thread detection device 220 and to apply tension thereto as will be described in further detail below. Either the tensioner robot 220 or the positioner robot 230 can be used to position the tensioned braided fibre sleeve 1 relative to the mandrel surface 111. Accordingly, the step of positioning the tensioned braided fibre sleeve 1 relative to the tool surface 111 can include either moving the braided fibre sleeve 1 onto the mandrel 110 using the tensioner robot 220 or it can alternatively include moving the mandrel 110 into the tensioned braided fibre sleeve 1 using the robotic arms 234.

One or more further robots 236 is provided for the purpose of smoothing and stretching the positioned braided fibre sleeve 1 to assist in conforming the sleeve to the shape of the mandrel surface 111.

A controller 250 (indicated by the dashed lines in FIG. 3) is programmed to instruct the tensioner robot 220 to carry out the step of applying tension to the axial threads 4 and to instruct either the tensioner robot 220 to move the braided fibre sleeve 1 towards the mandrel 110 or the positioner robot 230 to move the mandrel 110 towards the braided fibre sleeve 1 in order to position the sleeve 1 relative to the mandrel surface 111. After the tensioned braided fibre sleeve 1 is positioned on the mandrel surface 111, the controller is configured to instruct the tensioner robot 220 to release the tension on the axial threads 4. Each of the robots 220, 230 is provided with its own machine vision camera and control system such that each robot 220, 230 is capable of being programmed to operate independently of the others. However, the controller 250 integrates, for example, the control of the robots 220, 230 such that they operate simultaneously and in cooperation with each other. In an embodiment, the controller 250 is a programmable computer.

An embodiment of the operation of the system 200 is as follows.

The desired length of braided fibre sleeve 1, including two axial threads 4 woven therein, is spooled from the reel 242 of the rotatable sleeve carousel 240 and is cut by the length cutter 245. The cut braided fibre sleeve 1 is supported by the thread locators 205 in a position upstream of a lead-in end of the mandrel 110, ready to be placed on the mandrel 110 as shown schematically in FIG. 3 and FIG. 6. The axial threads 4 are then detected by the thread detection device 210 and the location co-ordinates of each of the axial threads 4, in this embodiment the location co-ordinates are at either end of the braided fibre sleeve 1, are captured as shown in FIG. 4 or 5.

After the presence of the axial threads 4 has been detected and the axial thread location coordinates captured, the robotic arms 224 of the tensioner robots 220 are configured to engage each of the axial threads 4 at the location coordinates and to apply tension thereto. It is envisaged that there are various ways of applying tension to each of the two axial threads 4 to form a tensioned braided fibre sleeve 1, as described below.

Figure 7:
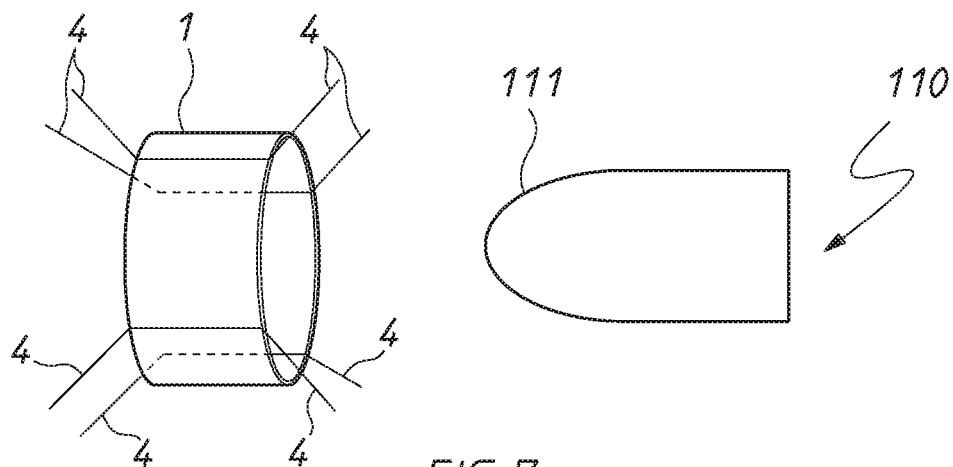
FIG. 7 is a schematic representation of a first embodiment of a tensioning step of an exemplary method.

In the embodiment of FIG. 7, each end of each of the four threads 4 is pulled at an angle of greater than zero degrees relative to the longitudinal axis x-x of the braided fibre sleeve 1 to apply tension thereto. This pulling action causes the biaxially oriented tows 2, 3 of the braided fibre sleeve to bunch together to achieve a concertina effect, which also has the effect of expanding or opening the length of a perimeter of the sleeve 1 as shown in FIG. 7. The expanded perimeter of the tensioned braided fibre sleeve 1 allows it to be easily positioned onto the mandrel surface 111.

Figure 8:
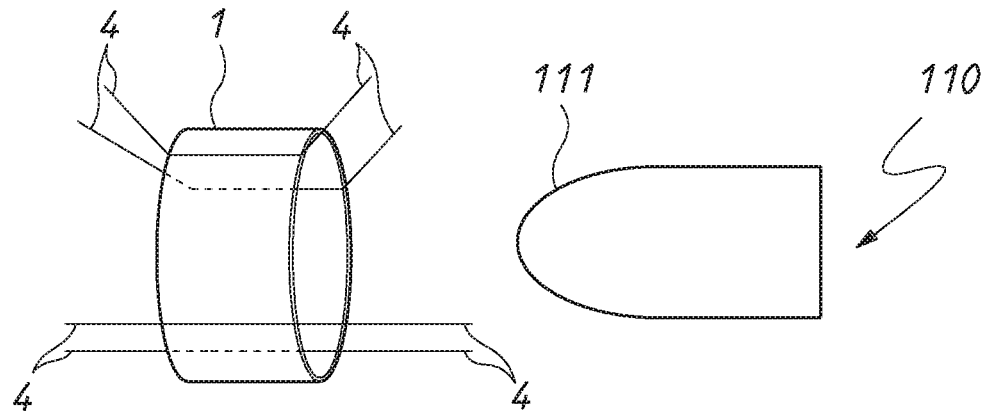
FIG. 8 is a schematic representation of a second embodiment of a tensioning step of an exemplary method.

In the embodiment of FIG. 8, a first and second thread of the axial threads 4 is pulled at an angle of greater than zero degrees relative to the longitudinal axis x-x of the braided fibre sleeve 1 to apply tension thereto. The third and fourth threads of the axial threads 4 are pulled at an angle of zero degrees relative to the longitudinal axis x-x of the braided fibre sleeve 1 to apply tension thereto. This pulling action causes the biaxially oriented tows 2, 3 of the braided fibre sleeve to concertina asymmetrically, such that the sleeve will bunch up more at the location of the first axial thread than at the location of the second axial thread. This tensioning technique can be used to bias the braided fibre sleeve 1 for example for correct orientation of the sleeve for placement onto an asymmetrically shaped mandrel or former or to create a bend in the braided fibre sleeve.

A variation of the tensioning technique of the embodiment of FIG. 8 is that the third and fourth axial threads 4 are pulled at an angle of greater than zero degrees relative to the longitudinal axis x-x of the braided fibre sleeve 1, but the angle at which they are pulled is smaller (or greater) than the angle at which the first and second axial threads are pulled. This tensioning technique again results in the sleeve bunching up more (or less) at the location of the first axial thread than at the location of the second axial thread.

Whilst it is necessary to hold the axial threads 4 at two longitudinally spaced locations to effect tension on the thread between the two longitudinally spaced locations, it is only necessary to pull on the thread at one of the locations to cause the bunching up of the sleeve. Accordingly, if the axial threads are pulled only at one end (or other location), the sleeve will bunch up at that end but not so much at the end (or other location) that is not pulled.

Figure 9:
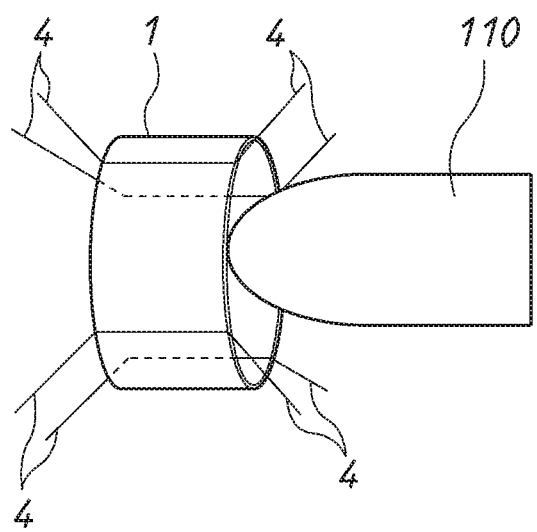
FIG. 9 is a schematic representation of a positioning step of an exemplary embodiment.

Once the desired tension has been applied to the braided fibre sleeve 1, the tensioned braided fibre sleeve 1 is positioned relative to the tool surface as shown schematically in FIG. 9. As described above, the positioning can involve either moving the braided fibre sleeve 1 onto the mandrel 110 using the robotic arms 224 or it can alternatively mean moving the mandrel 110 into the braided fibre sleeve 1 using the robotic arms 234.

In the former embodiment, the robotic arms 224 of the tensioner robots 220 hold the axial threads 4 of the braided fibre sleeve 1 at either end of the sleeve. The axial threads 4 are held by the robotic arms 224 at a position at which the axial threads are under the desired tension. The tensioner robots 220 may move the tensioned braided fibre sleeve 1 onto the mandrel surface 1 by moving the robotic arms 224 whilst maintaining the tension on the axial threads 4.

In the latter embodiment, the tensioner robots 220 may remain stationary, holding the axial threads 4 in tension. The positioner robot 230 may advance the mandrel 110 towards and into the tensioned braided fibre sleeve to the desired extent.

Figure 10:
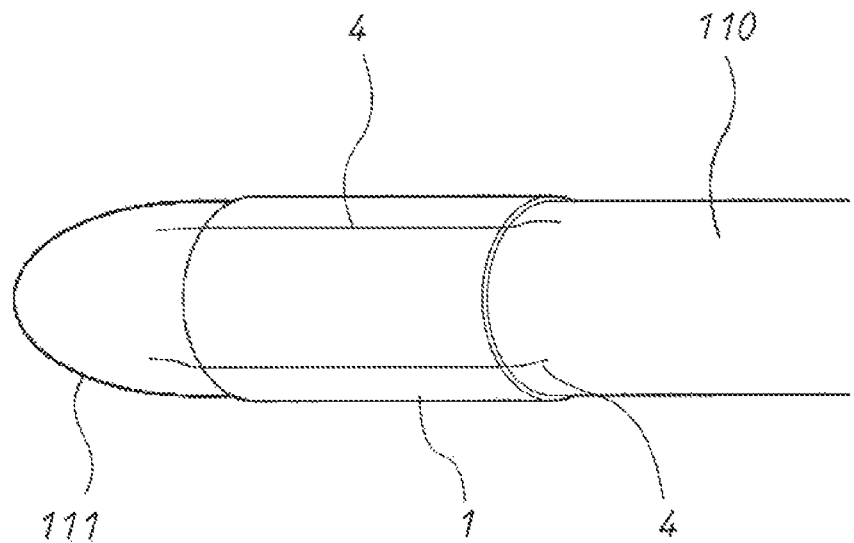
FIG. 10 is a schematic representation of a tension releasing step of an exemplary embodiment.
Figure 11:
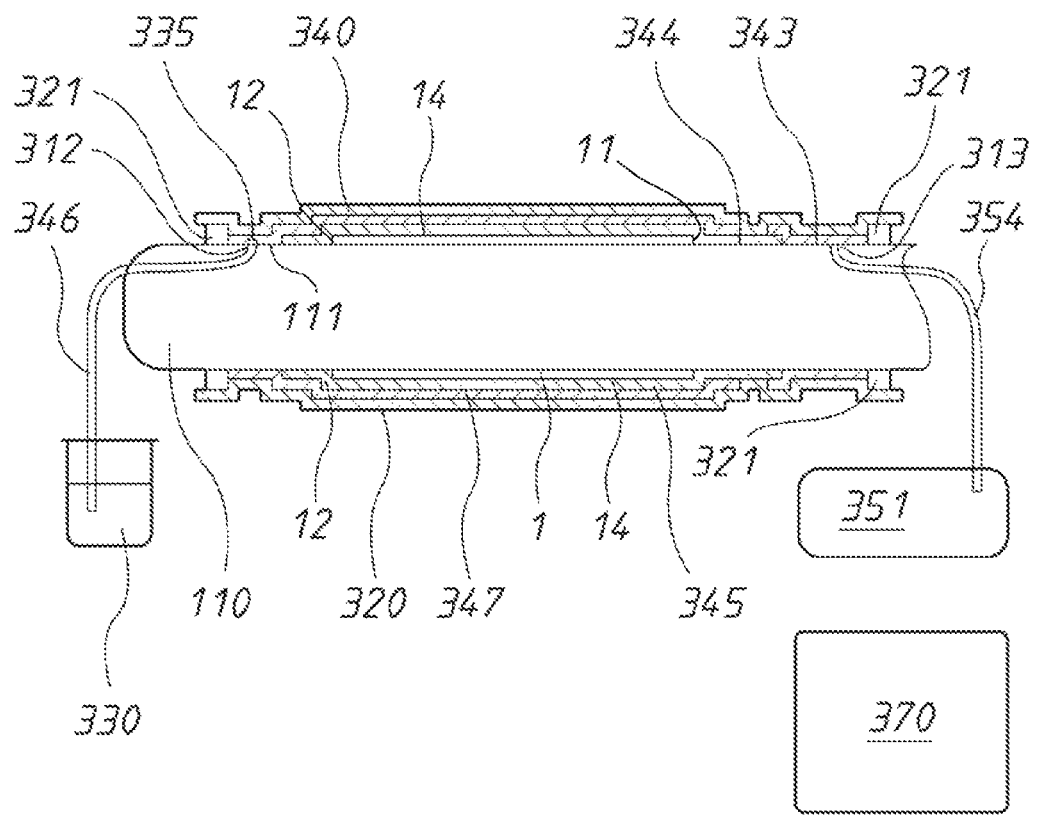
FIG. 11 is a schematic cross-sectional view of a system for resin infusion of a braided fibre sleeve.

After the tensioned braided sleeve 1 has been placed on the mandrel 110, the tension on the axial threads 4 is released. This causes some degree of relaxation of the braided fibre sleeve 1. The axial threads 4 can then remain in the part if required for their material properties or they can be removed by the robot arms 234 to leave behind a biaxial braided sleeve. The one or more further robots 236 smooth and stretch the positioned braided fibre sleeve to assist in conforming the sleeve to the shape of the mandrel surface 111, as shown in FIG. 10.

In some embodiments, both the mandrel 110 and the braided fibre sleeve 1 may be tens or even hundreds of metres long and the above process of placing the braided fibre sleeve relative to the tool surface can be carried out section by section of the braided fibre sleeve. In this case, multiple tensioner robots 220 could be used to apply tension to different sections of the braided fibre sleeve at any one time.

The operational steps of the system 200 described above can be implemented manually by the one or more technicians or by the use of the above described system 200 or by another suitable automated machine such as a five-axis gantry, which can also be controlled by the controller 250. The automated approach provides benefits in terms of speed, reliability, accuracy and reduced costs of manufacture.

Typically, multiple braided fibre sleeves 1 can be placed over one another to create a layup of multiple sleeves.

The positioned sleeve or sleeves can be trimmed and tied off in preparation for further processing steps, which will vary depending on the specific application. In some embodiments, in which the fibre sleeves include a binder or other stabilizer (e.g. a thermoplastic veil) the fibre sleeves may be heated to produce a preform. The preform is then cured to produce a composite component. For some components, curing may take place at room temperature. Alternatively, for embodiments in which the fibre sleeves are already pre-infused with resin, the fibre sleeves may be heat cured, typically in an oven 370, to produce a composite component. In still further embodiments, the sleeves can be laid up ready for resin infusion, followed by curing. The processes of resin infusion and curing are described below.

One or more braided fibre sleeves 1 are infused with an exothermically curing resin provided in a resin supply 330. A resin infusion system 300 includes a vacuum bagging film 320 that extends over the braided fibre sleeves on the mandrel 110 and is sealed relative to the mandrel or other tool surface 111 to define a sealed cavity between the vacuum bagging film 320 and the tool surface 111. The resin supply 330 communicates with the first cavity 340 through one or more resin infusion inlets 312 extending through the tool 110 on the upstream side of the braided fibre sleeve 1, via one or more resin supply pipes 346. A first vacuum source 351 communicates with the first cavity 340 through one or more vacuum outlets 313 extending through the tool 110 on a downstream side of the braided fibre sleeve 1, via one or more vacuum outlet pipes 354.

A flow path 335 extends from the resin supply 330, through the first cavity 340, the braided fibre sleeve 1 and to the first vacuum source 351. An upstream portion of the flow path 335 comprises the resin supply pipe(s) 346 and resin infusion inlet 312 extending through the tool 110. A mid portion of the flow path 335, defined by the first cavity 340, is formed by the braided fibre sleeve 1 and various layers of layup materials located beneath the vacuum bagging film 130. The layup materials include a permeable peel ply 345 located directly on, and extending over, the entirety of the braided fibre sleeve 1, with a downstream portion 344 of the peel ply 345 extending downstream of a downstream edge 11 of the braided fibre sleeve 1. A layer 347 of permeable flow media is placed over the peel ply 345 and extends beyond the upstream edge of the peel ply 345 to beyond the resin infusion inlet(s) 312. The layer 347 of permeable flow media extends to beyond the downstream edge 11 of the braided fibre sleeve 1 but does not cover the entirety of the downstream portion 344 of the peel ply 145. The peel ply 345 serves to prevent the layer 347 of permeable flow media from sticking to the braided fibre sleeve 1 and also provides a path for infusion of resin into the braided fibre sleeve 1, both along an upstream edge 12 of the braided fibre sleeve 1 and through an upper surface 14 of the braided fibre sleeve 1. The peel ply 345 also constitutes a permeable flow media, and may, for example, be in the form of a PTFE coated fibreglass fabric. The layer 347 of permeable flow media provides a passage for the resin through the first cavity 340 along the top of the braided fibre sleeve 1 and may suitably be in the form of a nylon mesh material, or any other highly permeable media enabling passage of resin therethrough.

A downstream portion of the flow path 335 comprises a further strip 343 of permeable flow media, the vacuum outlet(s) 313 and vacuum pipe(s) 354. The strip 343 of permeable flow media extends across the downstream edge of the downstream portion 344 of the peel ply 345 and extends further downstream across the vacuum outlet(s) 313. The strip 343 of permeable flow media is typically formed of the same material as the layer 343 of permeable flow media.

The vacuum bagging film 320 extends over the entire layup formed by the braided fibre sleeve 1, peel ply 345 and layer 347 and strip 343 of permeable flow media. The vacuum bagging film 320 is sealed relative to the tool surface 111 about the periphery of the vacuum bagging film 320 by way of strips 321 of sealing tape.

In use, once the system 300 has been assembled, the resin supply 330 is heated to bring the resin to a suitable resin infusion temperature. Typically the entire system is heated within the oven 370 that is also used for subsequent curing. The temperature for resin infusion will be dependent upon the resin system utilised, and will typically be selected to provide a suitable viscosity enabling the resin to flow through the resin flow path 335.

At least partial vacuum pressure is applied to the downstream end of the first cavity 340, via the first vacuum source 351 and vacuum outlet(s) 313. Maintaining at least partial vacuum on the resin supply ensures at least a partial vacuum is maintained throughout the first cavity 340. Atmospheric pressure acting on the braided fibre sleeve 1 through the vacuum bagging film 320, the layer 347 of permeable flow media and the peel ply 345 acts to consolidate the braided fibre sleeve 1.

After the braided fibre sleeve 1 has been fully infused, the resin infused braided fibre sleeve 1 may then be cured by gradually elevating the temperature of the oven 370 to a temperature suitable for curing of the resin. Full vacuum is typically maintained on the first vacuum source 351 during the curing process, to ensure the resin infused braided fibre sleeve 1 remains consolidated and to assist in curing of the resin.

The method and system of the disclosure enables the automation of part manufacture using commodity braids that can be manufactured at a low cost compared with an overbraided solution. The method and system of the disclosure has the potential to lower the cost of composite parts and enable higher manufacture rates than are currently achievable.

Figure 12:
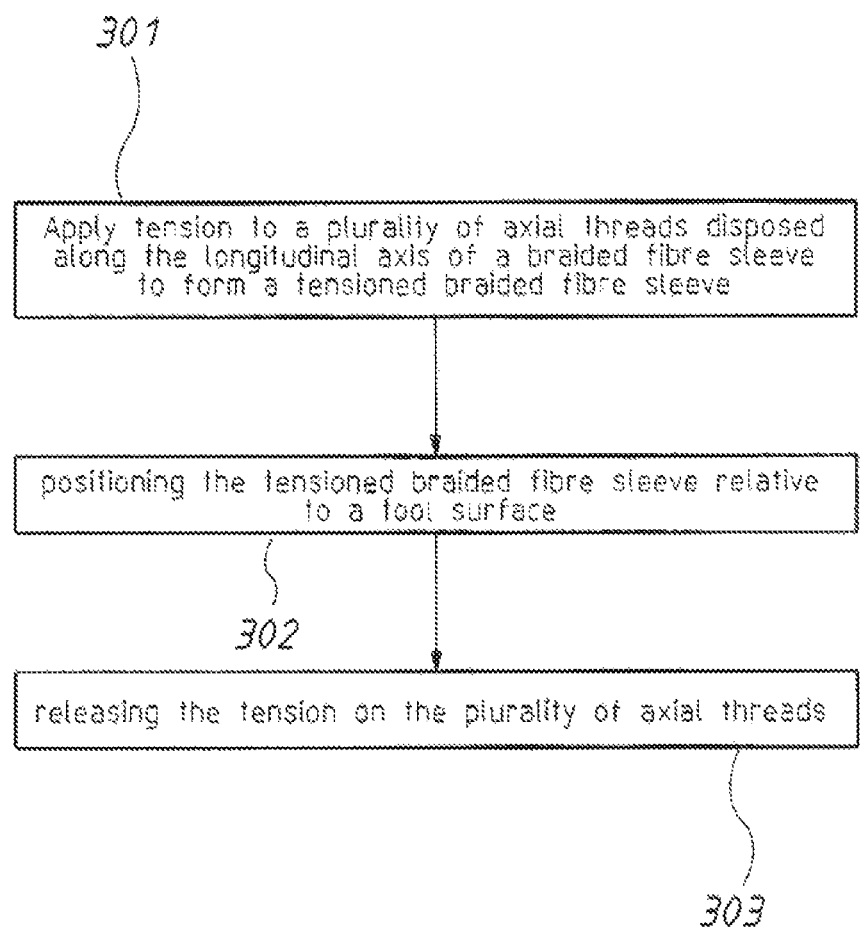
FIG. 12 is a flow chart showing the method steps of an exemplary method of positioning a braided fibre sleeve relative to a tool surface.

A general method of positioning a braided fibre sleeve relative to a tool surface is shown in FIG. 12. At block 301, tension is applied to a plurality of axial threads disposed along the longitudinal axis of a braided fibre sleeve to form a tensioned braided fibre sleeve. The tensioned braided fibre sleeve is positioned relative to a tool surface at block 302. The tension on the plurality of axial threads is released at block 303.

Persons skilled in the art will appreciate that the above specific embodiments described above are merely examples of the present disclosure. Persons skilled in the art will appreciate that the various features described in relation to different embodiments may be used in combination or as alternatives. Persons skilled in the art will also appreciate various other modifications and alternatives to the embodiments described.

What is claimed is:

1. A system for positioning a braided fibre sleeve relative to a tool surface, comprising:
    thread detection devices configured to detect a plurality of axial threads disposed along a longitudinal axis of the braided fibre sleeve and capture location coordinates of the plurality of axial threads;
    automated machines configured to pick the axial threads at the location coordinates captured by the thread detection devices and configured to apply tension to the detected plurality of axial threads to form a tensioned braided fibre sleeve and to position the tensioned braided fibre sleeve relative to the tool surface;
    the automated machines configured to operate independently of each other; and
    a computer controller that controls the automated machines to operate simultaneously and in cooperation to position the braided fibre sleeve onto the tool surface and to release the tension on the axial threads after the braided fibre sleeve is positioned on the tool surface.

2. The system of claim 1, wherein the thread detection devices comprise a camera configured to visually detect the plurality of axial threads.

3. The system of claim 1, wherein the thread detection devices comprise an electromagnet configured to magnetically detect ferrous material present in the plurality of axial threads.

4. The system of claim 1, wherein the automated machines are configured to move the tensioned braided fibre sleeve onto the tool surface.

5. The system of claim 1, wherein the automated machines are configured to move the tool surface into the tensioned braided fibre sleeve.

6. The system of claim 1, wherein the automated machines are configured to release the tension on the plurality of axial threads following the positioning of the tensioned braided fibre sleeve relative to the tool surface.

7. The system of claim 1, wherein the automated machines include at least one robot.

8. The system of claim 1, wherein the tool surface is the surface of a mandrel or former.

9. The system of claim 1, further comprising a loop track that extends along the tool surface and the automated machines are movable on the loop track along the tool surface.

10. The system of claim 9, wherein the automated machines comprise at least one or more first arms to apply tension to the detected plurality of axial threads to form a tensioned braided fibre sleeve, and one or more second arms to position the tensioned braided fibre sleeve relative to the tool surface.

11. The system of claim 1, further comprising:
    a first track that extends along a first side of the tool surface;
    a second track that extends along a second side of the tool surface;
    the automated machines comprise a first pair of devices positioned on the first and second tracks that apply tension to the detected plurality of axial threads to form a tensioned braided fibre sleeve; and
    the automated machines comprise a second pair of devices positioned on the first and second tracks to position the tensioned braided fibre sleeve relative to the tool surface.

12. The system of claim 1, further comprising a sleeve carousel configured to supply the braided fibre sleeve to the thread detection devices and the automated machines.

13. The system of claim 12, further comprising a cutter to cut the braided fibre sleeve after the braided fibre sleeve has been removed from the sleeve carousel.

14. A system for positioning a braided fibre sleeve relative to a tool surface, comprising:
    a first track that extends along a first side of the tool surface;
    a second track that extends along a second side of the tool surface;
    thread detection devices configured to detect each thread of a plurality of axial threads disposed along a longitudinal axis of the braided fibre sleeve;
    automated machines that are independently operable to move along the first and second tracks and pick the axial threads at location coordinates captured by the thread detection devices and apply tension to the detected plurality of axial threads to form a tensioned braided fibre sleeve and to position the tensioned braided fibre sleeve relative to the tool surface; and a computer controller that integrates control of the automated machines to operate simultaneously and in cooperation.

15. The system of claim 14, wherein the first and second tracks are each continuous loops.

16. The system of claim 14, wherein each of the automated machines comprises:

a tensioner robot that applies tension to the plurality of axial threads;

a positioner robot that positions the tensioned braided fibre sleeve relative to the tool surface;

the tensioner robot and the positioner robot are each independently moveable along one of the first and second tracks.

17. The system of claim 16, wherein the tensioner robot comprises a tension arm to pick the plurality of axial threads and apply tension to the plurality of threads.

18. The system of claim 16, wherein each of the tensioner robot and the positioner robot further comprise a camera.

19. The system of claim 14, wherein the automated machines are configured to smooth and stretch the braided fibre sleeve to conform the braided fibre sleeve to the tool surface.

20. The system of claim 14, wherein the automated machines comprise a first pair of devices positioned on the first and second tracks that apply tension to the detected plurality of axial threads to form a tensioned braided fibre sleeve and the automated machines comprise a second pair of devices positioned on the first and second tracks to position the tensioned braided fibre sleeve relative to the tool surface.

21. The system of claim 14, wherein the thread detection devices are positioned away from the track.

22. A system for positioning a braided fibre sleeve relative to a tool surface, comprising:

a first track that extends along a first side of the tool surface;

a second track that extends along a second side of the tool surface;

a first tensioner robot comprising first arms positioned on the first track, the first tensioner robot applies tension to the plurality of axial threads;

a first positioner robot comprising second arms positioned on the first track, the first positioner robot positions the braided fibre sleeve relative to the tool surface;

a first computer controller that controls the first tensioner robot to apply tension to the axial threads and controls the first positioner robot to move a tool that comprises the tool surface;

a second tensioner robot comprising third arms positioned on the second track, the second tensioner robot applies tension to the plurality of axial threads;

a second positioner robot comprising fourth arms positioned on the second track, the second positioner robot positions the braided fibre sleeve relative to the tool surface;

a second computer controller that controls the second tensioner robot to apply tension to the axial threads and controls the second positioner robot to move the tool.

23. The system of claim 22, further comprising at least one thread detection device configured to detect each thread of a plurality of axial threads disposed along a longitudinal axis of the braided fibre sleeve.

24. The system of claim 22, wherein each of the first and second tracks is a continuous loop.

* * * * *